United States Patent [19]

Haeflich

[11] Patent Number: 4,572,110

[45] Date of Patent: Feb. 25, 1986

[54] COMBINED HEAT RECOVERY AND EMISSION CONTROL SYSTEM

[75] Inventor: Jack Haeflich, West Hartford, Conn.

[73] Assignee: Energy Services Inc., Farmington, Conn.

[21] Appl. No.: 707,074

[22] Filed: Mar. 1, 1985

[51] Int. Cl.⁴ .............................................. F22D 1/00
[52] U.S. Cl. ................... 122/7 R; 122/1 R; 122/448 B
[58] Field of Search ............. 122/448 B, 95 TB, 7 R, 122/1 R

[56] References Cited

U.S. PATENT DOCUMENTS 4,421,068 12/1983 Aral ................................. 122/448 B
4,519,207 5/1985 Okabe et al. .................... 122/7 R X

FOREIGN PATENT DOCUMENTS 320525 10/1929 United Kingdom ............ 122/448 B

Primary Examiner—Edward G. Favors
Attorney, Agent, or Firm—Prutzman, Kalb, Chilton & Alix

[57] ABSTRACT

A gas turbine cogeneration plant having a combined heat recovery and emission control system with a first steam boiler having a bank of steam generating tubes upstream of a NOX emission reduction unit and second and third steam boilers having banks of steam generating tubes downstream of the NOX emission reduction unit and wherein the upstream steam boiler has a temperature responsive control system which regulates the upstream boiler pressure and thereby regulates the temperature and heat exchange rate of its steam generating tubes to regulate the temperature of the exhaust gas stream at the NOX emission reduction unit.

17 Claims, 2 Drawing Figures

COMBINED HEAT RECOVERY AND EMISSION CONTROL SYSTEM

BACKGROUND AND SUMMARY OF THE INVENTION

The present invention relates generally to cogeneration systems of the type conventionally employing a gas turbine for generating electricity, a heat recovery steam boiler system for generating steam from the high temperature exhaust gas and an emission control system for reducing the NOX or other pollutants in the engine exhaust gas, and the present invention relates more particularly to a new and improved method and apparatus for regulating the exhaust gas temperature for the reduction of the pollutants in the exhaust gas at a preestablished desired nominal temperature.

Cogeneration plants such as a conventional gas turbine cogeneration plant employed for generating electric power and steam are being subjected to increasingly stringent NOX emission standards and such that a satisfactory emission control system is required to minimize the undesirable emissions exhausted to the atmosphere. A selective catalytic reduction system (SCR system) is presently considered by some authorities to be the best available control technology for the reduction of NOX from the exhaust gas of a cogeneration plant and as a consequence is required equipment. Currently available SCR systems used for the reduction of NOX employ ammonia injection into the exhaust gas stream for reaction with the NOX in the presence of a catalyst to produce nitrogen and water vapor. Such SCR systems typically have an efficiency of 80-90 percent when the exhaust gas stream is at temperature within an optimum temperature range of approximately 600°-700° F. The NOX reduction efficiency of the SCR system will be significantly less if the temperature is outside the optimum temperature range. In addition, the usual SCR system catalyst can be damaged at higher temperatures.

The engine outlet temperature of most gas turbine cogeneration plants, at full or rated load of the gas turbine engine, is conventionally between approximately 775° F. and 1050° F. Since the exhaust gas temperature is above the optimum temperature range of the usual SCR system, it is necessary to reduce the temperature of the exhaust gas stream before it passes through the SCR system. Current practice is to provide steam superheater and/or steam generating tubes upstream of the SCR system to withdraw heat from the exhaust gas stream to cool the gas to a preselected desired nominal temperature before it passes through the SCR system. The exhaust gas stream is then conducted through the remaining sections of the waste heat recovery boiler or other heat transfer system for generating additional steam, heating feedwater, etc. In the upstream heat exchanger, the heat transfer rate for exhaust gas stream cooling must be carefully calculated, taking into account the temperature and flow of the exhaust gas stream and the temperature and flow of the internal working fluid of the heat exchanger. Such imposes significant operating limitations on the cogeneration plant which either seriously limit the operating range of the gas turbine engine or require an undesirable exhaust gas bypass, adjustable damper or other mechanism for diverting a portion of the exhaust gas stream from the upstream heat exchanger. In addition, where supplementary firing is provided to increase steam production, the supplementary firing is conventionally located downstream of the SCR system because it heats the exhaust gas above the optimum temperature range of the SCR system. That is undesirable because it reduces the steam generating efficiency and produces additional NOX that is not removed by the SCR system. If the environmental authorities require supplementary firing to be placed upstream of the SCR system, the conventional upstream heat exchanger will not maintain SCR temperature within the optimum range throughout the full range of supplementary firing. Thus, either the gas turbine power will have to be reduced to accommodate a reduction in full load steam demand, excess steam will have to be dumped or an exhaust gas bypass, damper, etc., will have to be employed to divert a portion of the exhaust gas from the upstream heat exchanger. The disadvantages of reducing the power output of the gas turbine engine are well known and include reduced electric power generation, increased specific fuel consumption and increased gas turbine maintenance costs due to thermal cycling. Although steam dumping can sometimes be used, for example to drive a condensing steam turbine, such an approach is often impractical due to capital cost and steam turbine operation considerations. For those reasons, many gas turbine cogeneration plants currently use an exhaust gas bypass stack for controlling the heat energy content of the exhaust gas stream conducted through the heat recovery system.

It is a principal object of the present invention to provide in a cogeneration system of the type described, a new and improved method and apparatus for regulating the exhaust gas temperature for the removal of pollutants from the exhaust gas at a preselected desired nominal temperature throughout the full range of operation of the cogeneration system.

It is another object of the present invention to provide in a gas turbine electric power and steam cogeneration system, a new and improved method and apparatus for regulating the temperature of the engine exhaust gas stream for efficient reduction of certain undesirable emissions while permitting the internal combustion engine to operate at maximum efficiency and a supplementary firing system to be used to increase steam production.

It is a further object of the present invention to provide in a gas turbine engine cogeneration plant of the type having a catalytic emission control system for the catalytic reduction of certain undesirable emissions, a new and improved method and apparatus for maintaining the exhaust gas stream passing through the catalyst at a preselected desired nominal temperature providing generally optimum effectiveness of the catalytic process without employing a conventional exhaust gas bypass stack, damper or other mechanism for diverting any of the exhaust gas stream.

It is another object of the present invention to provide in a combined heat recovery and emission control system operable for recovering heat from and reducing pollutants in a high temperature exhaust gas stream, a new and improved method and apparatus for regulating the temperature of the exhaust gas stream for the efficient reduction of pollutants.

Other objects and advantages of the present invention will become apparent from the accompanying drawings and detailed description.

DESCRIPTION OF THE PREFERRED EMBODIMENTS

Figure 1A:
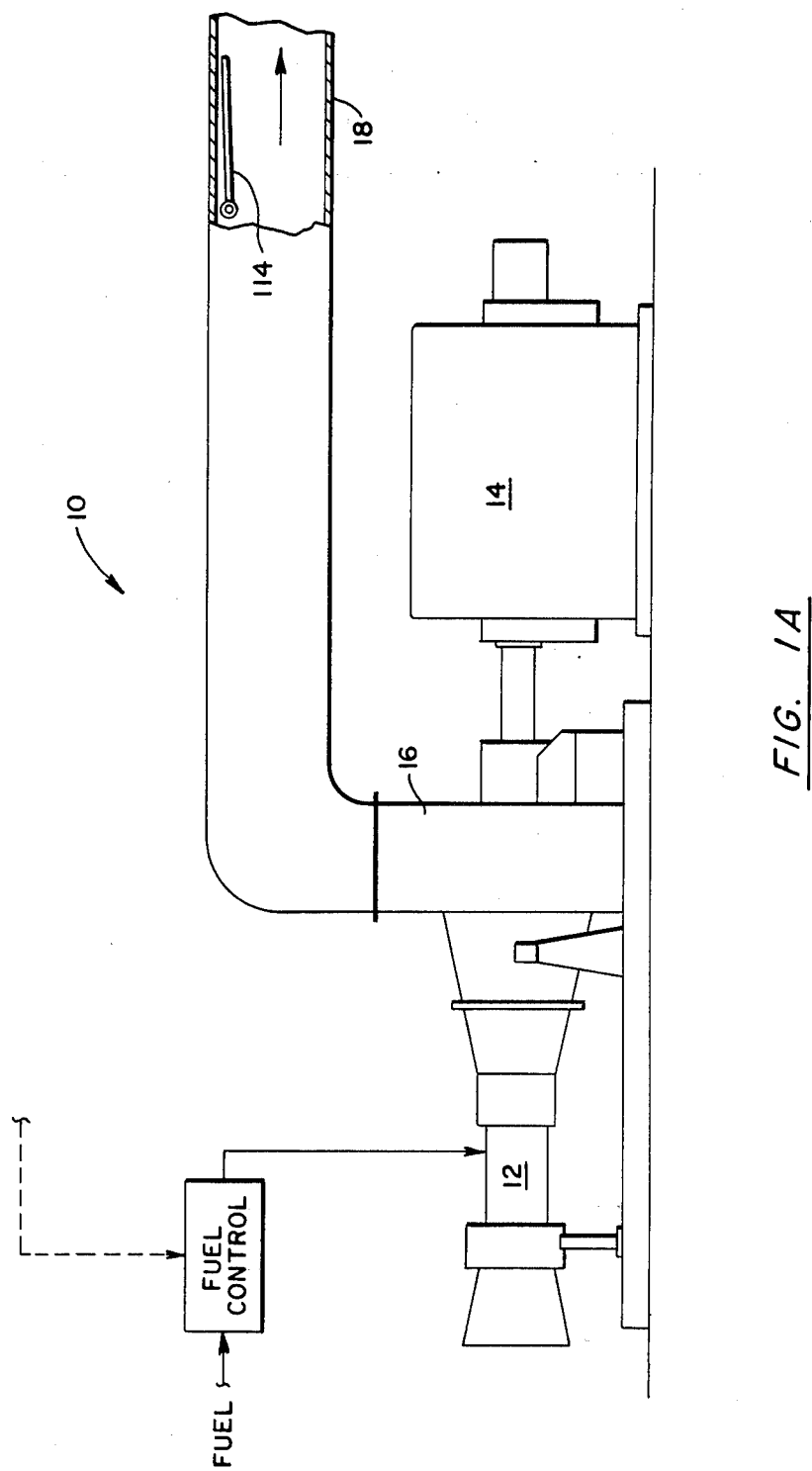
FIGS. 1A and 1B together provide a generally diagrammatic elevation view of a cogeneration plant incorporating an embodiment of the present invention, additionally showing a modification thereof in phantom lines.

Referring to the drawings in detail wherein like numerals represent the same or like parts, a cogeneration plant 10 employing an embodiment of the present invention is shown comprising a gas turbine internal combustion engine 12 connected for driving an electric generator 14 for generating electric power in a conventional manner. In order to provide maximum electric power generating efficiency (i.e. minimum specific fuel consumption) the gas turbine engine 12 is preferably continuously operated at its rated load, thereby producing an exhaust gas stream having a predetermined temperature, velocity and mass rate of flow at the gas turbine outlet 16. Typically, the exhaust gas temperature at the gas turbine outlet 16 at rated engine load ranges from between 775° F. and 1050° F. depending on the gas turbine engine employed and the rate of water injection into the engine combustion chamber.

An outlet duct 18 connects the engine outlet 16 via a diverging duct 20 to an elongated duct 22 having a large generally constant cross-sectional area. The latter duct 22 provides for conducting the exhaust gas stream through a combined heat recovery and emission control system 24 to a vertical stack 26 which exhausts the gas stream to atmosphere.

The cogeneration plant 10 is described herein for use in supplying steam to a steam conduit system 28 having a high pressure header 30 with a preselected nominal pressure of 300 psig and a low pressure header 32 with a preselected nominal pressure of 10 psig. In a conventional manner, the high pressure steam header 30 may be used to supply high pressure steam to a manufacturing facility and/or auxiliary steam generator and the low pressure steam header 32 may be used to supply low pressure steam to the manufacturing facility and/or to a feedwater dearator.

The heat recovery system 36 is shown comprising three separately controlled steam boiler heat exchangers 38–40, each having an upper steam drum 42–44, a bottom mud drum 46–48 and a bank 50–52 of heat transfer or steam generating tubes connected between the steam and mud drums. For example, each bank 50–52 of steam generating tubes comprises 10–20 rows of tubes with 10–20 tubes in each row. The gas stream duct 22 conducts the gas stream through the banks 50–52 of steam generating tubes to generate steam with each of the three steam boilers 38–40.

The downstream or last stage steam boiler 40 supplies steam to the low pressure steam header 32 and, as hereinafter described, is controlled to maintain header 32 at a preselected relatively low nominal pressure (e.g. 10 psig in the described embodiment). The upstream or first stage steam boiler 38 maintains the temperature of the exhaust gas stream at a preestablished desired nominal temperature (625° F. in the described embodiment) at an emission control unit 60 mounted between the banks 50, 51 of steam generating tubes of the first and intermediate stage boilers 38, 39. The intermediate stage boiler 39 supplies steam to the high pressure steam header 30 and, as hereinafter described, is controlled to maintain header 30 at a preselected relatively high nominal pressure (e.g. 300 psig in the described embodiment).

Suitable stop/check and flow control valves 62, 64 are connected in series between the last stage steam drum 44 and the low pressure steam header 32. Similarly, stop/check and flow control valves 62, 64 are connected in series between the intermediate stage steam drum 43 and high pressure header 30, and stop/check and flow control valves 62, 64 are connected in series between the first stage steam drum 42 and high pressure header 30. A suitable pressure control system 70 having a pressure sensor 72 for sensing the pressure in the low pressure steam header 32, operates the third stage flow control valve 64 to maintain the low pressure steam header 32 at the desired nominal pressure (e.g. 10 psig in the described embodiment). Thus, the flow control valve 64 is incrementally opened by the pressure control system 70 as the steam pressure in the low pressure header 32 falls below that level and is incrementally closed by the pressure control system 70 as the steam pressure in the low pressure header 32 rises above that level. Accordingly, the third stage control valve 64 is operated to regulate the supply of steam to the low pressure steam header 32 in accordance with the steam demand from that header.

In the same manner, an intermediate stage pressure control system 74 having a pressure sensor 76 for sensing the pressure in the high pressure steam header 30, incrementally opens and closes the intermediate stage flow control valve 64 to maintain the pressure in the high pressure steam header 30 at its nominal pressure level, thereby regulating the supply of steam to the high pressure steam header 30 in accordance with the steam demand from that header.

In all three boilers 38–40 in the disclosed embodiment, the entire boiler including the steam drum, mud drum, and steam generating tubes are designed for a maximum pressure which is significantly higher than the pressure of the high pressure steam header 30 and at least equal to the maximum boiler pressure which can be reached when the respective flow control valve 64 is closed. In all three boilers, with the flow control valve 64 closed, the maximum pressure is a function of the gas stream temperature at the emission control unit 60. For example, with a maximum gas stream temperature of 637° F. at the emission control unit 60, the maximum pressure of each boiler 38–40, with the steam valve 64 closed, is 2,000 psig (i.e. the saturation pressure at 637° F.). Thus, in the described embodiment the three steam boilers are designed for 2,000 psig even though each of those boilers 38–40 normally operates at a substantially lower pressure. Also, as a safety measure, a suitable pressure relief valve (not shown) is provided for each of the three boilers 38–40 to ensure that the boiler pressure does not exceed the designed pressure limit.

As described, the intermediate and last stage boilers 39, 40 are regulated to supply steam to the high pressure and low pressure headers 30, 32 on demand. When there is no demand from either header, or that demand is relatively low, there is no requirement for dumping steam from the corresponding boiler. Of course, in some installations, the steam demand from the second and/or third stage boiler 39, 40 could be in excess of the maximum steaming rate of the boiler (with the excess being provided by a separate source), and such that the second and/or third stage boiler 39, 40 could be designed to operate at a maximum pressure (e.g. 500 psig) significantly less than the saturation pressure at the emission control unit temperature. Also, a suitable exhaust by-pass stack, damper or other mechanism (not shown) could be employed downstream of the SCR emission control unit for maintaining the pressure of the second stage boiler 39 and/or third stage boiler 40 at a relatively low pressure (e.g. 500 psig) by diverting a portion of the exhaust gas stream from that boiler.

The emission control unit 60 in the disclosed embodiment provides for selective catalytic reduction (SCR) of the NOX emissions in the exhaust gas stream. Currently available SCR systems for NOX emission reduction use an ammonia injection unit 78 for mixing ammonia (NH3) with the exhaust gas stream as diagramatically shown in FIG. 1B. The exhaust gas and ammonia mixture is then conducted through a porous catalytic bed 80 to cause the ammonia to react with the nitrogen oxides in the presence of the catalyst to form nitrogen and water vapor. Typical efficiencies achieved by such SCR systems are 80-90 percent when the temperature of the exhaust gas stream passing through the catalyst bed 80 is within an optimum temperature range required by the SCR, typically approximately 600°-700° F. When the temperature is outside that optimum range, the efficiency is less and when the temperature is above that range, the catalyst can be damaged. Accordingly, to achieve optimum efficiency and operation of the SCR emission control unit 60 or where required to comply with strict emission standards, it is important to maintain the gas stream temperature at the SCR unit 60 within the optimum temperature range (e.g. 600°-700° F. in the described embodiment). Also, in order to avoid exceeding the designed pressure limit of each of the three boilers 38-40, it is necessary to prevent the temperature of the exhaust gas stream at the SCR unit 60 from exceeding the designed temperature limit (e.g. 637° F. in the described embodiment).

As described in the disclosed embodiment, the first stage boiler 38 is designed for the same maximum pressure (e.g. 2,000 psig) as the intermediate and last stage boilers 39, 40. A temperature control system 84, having a temperature sensor 86 for sensing the temperature of the gas stream at the SCR emission control unit 60, is employed for controlling the steam flow from the first stage boiler 38 to the high pressure header 30 to regulate the exhaust gas stream temperature at a preselected desired temperature level (e.g. 625° F. in the described embodiment). The first stage flow valve 64 is incrementally opened, thereby increasing the steam flow to the high pressure steam header 30, to lower the pressure and temperature and increase the heat exchange rate of the boiler 38. Similarly, the first stage control valve 64 is incrementally closed, thereby decreasing the steam flow to the high pressure steam header 30, to increase the boiler pressure and temperature and decrease the heat exchange rate of the boiler 38. As the water saturation temperature of the boiler 38 varies directly with pressure, the heat transfer rate and temperature drop across the bank 50 of steam generating tubes of the first stage boiler 38 vary with the first stage boiler pressure. Thus, as the upstream exhaust gas temperature increases, the first stage boiler pressure is decreased to increase the heat transfer rate and maintain the exhaust gas temperature at the emission control unit 60 at the preselected desired nominal level. Conversely, as the upstream exhaust gas temperature decreases, the first stage boiler pressure is increased to decrease the heat exchange rate and maintain the exhaust gas stream temperature at the emission control unit 60 at the preselected level.

Accordingly, the pressure of the first stage boiler 38 is automatically regulated to maintain the desired gas stream temperature at the emission control unit 60. The amount of steam delivered by the first stage boiler to the high pressure steam header 30 is not regulated in accordance with the steam demand from that header. Instead, as described, the second stage boiler 39 is used as a demand controlled boiler for supplying steam to the high pressure steam header 30. The maximum steaming rate of the second stage boiler 39 is reached when its flow control valve 64 is fully opened and the boiler pressure is at its minimum operating pressure. The saturation temperature of the second stage boiler 39 is then at its miminum level (422° F. at 300 psig) to provide its maximum heat transfer and steaming rates.

Similarly, the third stage boiler 40 has a maximum steaming rate when its flow control valve 64 is fully opened and the boiler is at its minimum operating pressure. At that pressure, the last stage boiler 40 is at its minimum saturation temperature (240° F. at 10 psig) to provide its maximum heat exchange and steaming rates. Since the pressure of the second stage boiler 39 determines the exhaust gas inlet temperature at the third stage boiler 40, the maximum potential steaming rate of the third stage boiler 40 is dependent on the operation of the second stage boiler 39.

A supplementary firing system 90 is provided for supplying additional steam to the high pressure steam header 30 when the first and second stage boilers 38, 39 do not meet the steam demand and such that the steam pressure in the high pressure steam header 30 falls below the boiler regulated level (e.g. 300 psig in the described embodiment) to a slightly lower level (e.g. 290 psig). The supplementary firing system 90 comprises a fuel injection unit 92 with an array of fuel nozzles mounted within the gas stream duct 18 between the gas turbine and the first stage boiler 38. Fuel is injected downstream into the exhaust gas stream and burns quickly and completely (without the need for supplementary air since the exhaust gas contains sufficient oxygen) to increase the temperature and mass rate of flow of the gas stream. The amount of fuel supplied to the fuel injection unit 92 is incrementally controlled by a pressure control system 94 having a pressure sensor 96 for the high pressure header 30. The pressure control system 94 operates automatically at the supplementary heating level (e.g. 290 psig in the described embodiment) to maintain the pressure in the high pressure steam header 30 at that pressure level. Accordingly, when the steam header pressure decreases to the supplementary heating level, a fuel valve 98 for the fuel injection unit 92 is incrementally opened to increase the steaming rate of the first stage boiler 38 (due to the increased mass flow rate through the first stage boiler 38 and the higher inlet temperature at the first stage boiler 38) and second stage boiler 39 (due to the increased mass flow rate through the second stage boiler 39). Likewise, the fuel valve 98 will be incrementally closed as the pressure in the high pressure steam header 30 rises above the supplementary heating level. Thus, the supplementary firing system is used to meet a steam demand in excess of the maximum rate at which steam is generated by the first and second stage boilers 38, 39 without supplementary firing. Also, because of the wide available operating range of the first stage boiler 38 and therefore the substantial permissible exhaust gas temperature range at the inlet to the first stage boiler 38, that inlet temperature can be varied to meet the steam demand from the high pressure steam header 30. At the same time, the exhaust gas temperature at the SCR emission control unit 60 is maintained at the preselected desired nominal temperature. For example, with a specific gas turbine operating at rated load, with exhaust gas flow of 1,000,000 lb./hr. at 775° F., the boiler system can supply steam to the high pressure and low pressure steam headers 30, 32 at a rate of approximately 120,000 pounds/hour without supplementary firing and up to 250,000 pounds/hour with supplementary firing.

To obtain an exhaust gas temperature of 625° F. at the SCR emission control unit 60, with the gas turbine engine 12 at rated load and without supplementary firing, the first stage boiler 38 will produce approximately 33,000 lb/hr. of steam. Therefore, the steaming rate is controllable within a wide range from a minimum of 33,000 pounds/hour to a maximum of 250,000 a per hour, a turn-down ratio greater than 7:1, without the use of a bypass stack or other gas diverting mechanism and without reducing the power output of the gas turbine engine 12 and while maintaining the exhaust gas temperature at the emission control unit 60 at the desired level.

A pressure control system 100 for the gas turbine engine 12 has a pressure sensor 102 for sensing the pressure of the high pressure steam header 30. The pressure control system 100 regulates the engine fuel consumption (and thereby also the electric generator load) to prevent the header pressure from exceeding a preselected nominal level (e.g. 310 psig) which is slightly above the preselected nominal pressure level (e.g. 300 psig in the described embodiment) of the high pressure header 30. During normal operation, the gas turbine engine 12 is run at full or rated load providing maximum gas turbine efficiency. If the steam demand from the high pressure steam header 30 is less than the steaming rate of the first stage boiler 38 (with the supplementary firing system 90 completely off), and if as a result, the steam pressure in the the high pressure header 30 increases slightly to the engine controlled level (310 psig in the described embodiment), the fuel consumption of the engine will be incrementally reduced to maintain the steam header pressure at that level. Accordingly, the gas turbine engine 12 is maintained at rated load as long as the high pressure steam demand is above a predetermined rate for which the system is designed (e.g. 33,000 pounds steam/hour in the described embodiment).

A fresh air supply system 110 is provided for supplying fresh air to the supplementary firing unit 92 when the gas turbine engine 12 is shut down. The fresh air supply system 110 comprises a blower 112 and an air valve 113 for supplying sufficient air for combustion of the fuel injected by the supplementary firing system 90. In that mode of operation, a suitable damper 114 mounted in the duct 18 upstream of the fresh air supply system 110 is closed.

During start-up, the gas turbine engine 12 initially produces an exhaust gas stream having a relatively low mass flow rate and temperature. The three boiler sections 38-40 are relatively cold and at relatively low pressure. The inlet temperature at the SCR unit 60 is below optimum and therefore the temperature responsive flow control valve 64 for the first stage boiler 38 is fully closed. If the high pressure steam header 30 is below the preselected nominal pressure level (e.g. 300 psig), the pressure responsive flow control valve 64 for the second stage boiler 39 is fully opened. If the pressure of the low pressure steam header 32 is below its preselected nominal level (e.g. 10 psig), the steam valve 64 for the third stage boiler 40 is fully opened. The control system 94 for the supplementary firing system is de-energized during start-up and the fuel valve 96 for the fuel injection unit 92 is closed.

As the gas turbine power gradually increases, by either suitable manual or automatic control, the exhaust gas flow rate and temperature are gradually increased to gradually increase the temperature and pressure of each of the three boilers 38–40. When the second stage boiler pressure equals the existing pressure of the high pressure steam header 30, steam begins to flow from the second stage boiler 39 to the high pressure steam header 30. Likewise, when the third stage boiler pressure equals the existing pressure of the low pressure header 32, steam begins to flow from the third stage boiler 40 to the low pressure header 32. When the temperature of the exhaust gas stream at the SCR unit 60 reaches the preselected desired nominal temperature (e.g. 625° F. in the described embodiment), the steam valve 64 for the first stage boiler 38 is incrementally controlled to maintain that SCR temperature. When the gas turbine engine 12 is at full rated power and all three boilers 38–40 are operating normally, the control 94 for the supplementary firing system 90 is energized to provide for automatic supplementary firing as needed.

Figure 1B:
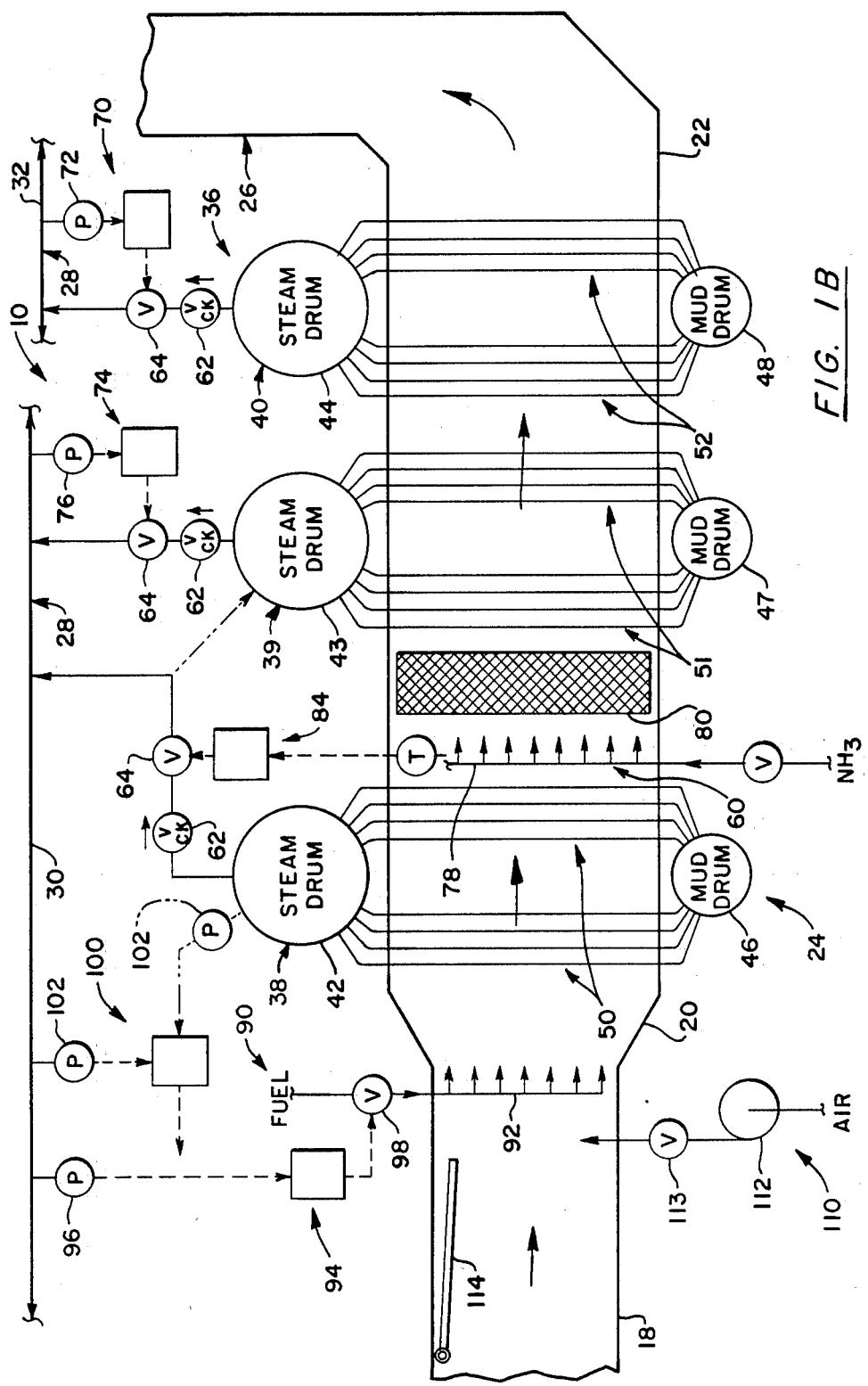

As shown in phantom in FIG. 1B, the steam drum 42 of the first stage boiler 38 may be connected to the steam drum 43 of the second stage boiler 39 rather than directly to the high pressure steam header 30. With that modification, the first stage boiler 38 supplies steam to the high pressure steam header 30 indirectly via the steam drum 43 of the second stage boiler 39. The temperature control system for the first stage boiler 38 continues to function in the manner described to control the exhaust gas temperature at the emission control unit 60; however, the pressure control system 100 for the gas turbine engine 12 has its pressure sensor mounted for sensing the pressure of the first stage steam drum 42 instead of the high pressure steam header 30. The pressure control system 100 will then regulate the gas turbine power to limit the pressure of the first stage boiler 38 to a preselected maximum pressure (2,000 psig in the described embodiment). This modified arrangement may be advantageous in certain installations in reducing the required connections to the steam header 30 and simplifying any superheater and desuperheater systems (not shown) of the cogeneration plant. Also, in some installations the modified arrangement would permit using a smaller steam drum 42 for the first stage boiler 38 and also simplify its internal steam separater (not shown).

As may be desired, each of the three boilers 38–40 may have a superheater (not shown) with a suitable bank of superheater tubes mounted for superheating the steam generated by the boiler. Because the exhaust gas stream is maintained at a constant temperature at the emission control unit 60, the superheater tubes are advantageously mounted immediately downstream of that unit 60 to maintain a narrow range of steam superheat temperature.

What is claimed is:

1. In a cogeneration plant having a gas turbine engine, an electric generator driven by the engine and a combined heat recovery and emission control system for the recovery of heat from and reduction of pollutants in the exhaust gas stream from the engine, the combined system comprising a plurality of steam boilers, each having at least one bank of a plurality of steam generating tubes, a steam conduit system having a first steam header for supplying steam at a first preselected nominal pressure, an emission control unit for reducing pollutants in the exhaust gas stream by chemical conversion, a duct for conducting the exhaust gas stream through said banks of steam generating tubes and the emission control unit, the plurality of steam boilers comprising a first steam boiler having its said bank of steam generating tubes upstream of the emission control unit and a second steam boiler having its said bank of steam generating tubes downstream of the emission control unit, said first and second steam boilers being connected for supplying steam to the steam conduit system, the improvement wherein said first steam boiler is an exhaust gas temperature regulating boiler having a first, exhaust gas temperature responsive, boiler control system for regulating the supply of steam from said first steam boiler to the steam conduit system in accordance with the temperature of the exhaust gas stream at the emission control unit, to vary the operating pressure of said first steam boiler, and thereby vary the temperature and heat exchange rate of said bank of steam generating tubes of said first steam boiler, to maintain the exhaust gas stream at the emission control unit at a preestablished desired nominal temperature for said chemical conversion.

2. A cogeneration plant according to claim 1 wherein said second steam boiler is a pressure regulating boiler having a second, pressure responsive, boiler control system for regulating the supply of steam from said second steam boiler to the steam conduit system, to maintain said first steam header at said first preselected nominal pressure, thereby varying the operating pressure of said second steam boiler and the temperature and heat exchange rate of said bank of steam generating tubes of said second steam boiler in accordance with the steam demand from said first steam header.

3. A cogeneration plant according to claim 2 wherein the engine comprises a pressure responsive fuel control system for regulating the rate of fuel consumption of the engine to prevent the pressure of said first steam header from exceeding a predetermined nominal pressure greater than said first preselected nominal pressure.

4. A cogeneration plant according to claim 1 wherein the plurality of steam boilers comprise a third steam boiler having its said bank of steam generating tubes downstream of said bank of steam generating tubes of said second steam boiler, wherein said first preselected nominal pressure is a relatively high nominal pressure and the steam conduit system has a second steam header for supplying steam at a second preselected relatively low nominal pressure, and wherein said first and second steam boilers are connected for supplying steam to said first steam header and said third steam boiler is connected for supplying steam to said second steam header.

5. A cogeneration plant according to claim 4 wherein said third steam boiler is a pressure regulating boiler having a third, pressure responsive, boiler control system for regulating the supply of steam from said third steam boiler to said second steam header, to maintain said second steam header at said second preselected nominal pressure, therby varying the operating pressure of said third steam boiler and the temperature and heat exchange rate of said bank of steam generating tubes of said third steam boiler in accordance with the steam demand from said second steam header.

6. A cogeneration plant according to claim 1 wherein said first steam boiler is connected to supply steam directly to the steam conduit system.

7. A cogeneration plant according to claim 1 wherein said second steam boiler is connected to supply steam directly to the steam conduit system and said first steam boiler is connected to supply steam indirectly to the steam conduit system via said second steam boiler, and wherein the engine comprises a pressure responsive fuel control system for regulating the rate of fuel consumption of the engine to prevent the pressure of said first steam boiler from exceeding a predetermined nominal pressure having a water saturation temperature greater than said preestablished desired nominal temperature of the exhaust gas stream at the emission control unit.

8. A cogeneration plant according to claim 1 further comprising a supplementary firing system having a supplementary fuel injection unit in the duct upstream of said bank of steam generating tubes of said first steam boiler and a supplementary fuel control system for regulating the supply of fuel to the supplementary fuel injection unit to prevent the pressure level in said first steam header from decreasing below a predetermined nominal pressure less than said first preselected nominal pressure.

9. A cogeneration plant according to claim 8 further comprising a fresh air supply system for supplying fresh air to the duct upstream of the supplementary fuel injection unit and a damper mounted in the duct upstream of the fresh air supply system to separate the fresh air supply system from the engine.

10. A method of recovering heat from and reducing the pollutants in a high temperature exhaust gas stream with a combined heat recovery and emission control system having a plurality of steam boilers, each having at least one bank of a plurality of steam generating tubes, a steam conduit system having a first steam header for supplying steam at a first preselected nominal pressure, an emission control unit for reducing pollutants in the exhaust gas stream by chemical conversion, a duct for conducting the exhaust gas stream through said banks of steam generating tubes and the emission control unit, the plurality of steam boilers comprising a first steam boiler having its said bank of steam generating tubes upstream of the emission control unit and a second steam boiler having its said bank of steam generating tubes downstream of the emission control unit, said first and second steam boilers being connected for supplying steam to the steam conduit system, the method comprising the step of regulating the supply of steam from said first steam boiler to the steam conduit system in accordance with the temperature of the exhaust gas stream at the emission control unit, to regulate the operating pressure of said first steam boiler, and thereby vary the temperature and heat exchange rate of said bank of steam generating tubes of said first steam boiler, to maintain the exhaust gas stream at the emission control unit at a preestablished desired nominal temperature for said chemical conversion.

11. A method according to claim 10 further comprising the step of regulating the supply of steam from said second steam boiler to the steam conduit system, to maintain said first steam header at said first preselected nominal pressure, thereby varying the operating pressure of said second steam boiler and the temperature and heat exchange rate of said bank of steam generating tubes of said second steam boiler in accordance with the steam demand from said first steam header.

12. A method according to claim 10 for recovering heat from and reducing the pollutants in a high temperature exhaust gas stream from an internal combustion engine, further comprising the steps of regulating the rate of fuel consumption of the engine to prevent the pressure in said first steam header from exceeding a predetermined nominal pressure greater than said first preselected nominal pressure.

13. A method according to claim 10 further comprising the step of heating the high temperature exhaust gas stream by the injection of fuel into the stream upstream of said bank of steam generating tubes of said first steam boiler and the step of regulating the rate of said fuel injection to prevent the pressure in said first steam header from decreasing below a predetermined nominal pressure less than said first preselected nominal pressure.

14. A method of recovering heat from and reducing the pollutants in a high temperature exhaust gas stream with a combined heat recovery and emission control system having a plurality of steam boilers, each having at least one bank of a plurality of steam generating tubes, a steam conduit system having a first steam header for supplying steam at a first preselected nominal pressure, an emission control unit for reducing pollutants in the exhaust gas stream by chemical conversion, a duct for conducting the exhaust gas stream through said banks of steam generating tubes and the emission control unit, the plurality of steam boilers comprising a first steam boiler having its said bank of steam generating tubes upstream of the emission control unit and a second steam boiler having its said bank of steam generating tubes downstream of the emission control unit, said first and second steam boilers being connected for supplying steam to the steam conduit system, the method comprising the step of regulating the supply of steam from said first steam boiler to the steam conduit system in accordance with the temperature of the exhaust gas stream at the emission control unit, to regulate the operating pressure of said first steam boiler, and thereby regulate the temperature and heat exchange rate of said bank of steam generating tubes of said first steam boiler, to maintain the exhaust gas stream at the emission control unit at a preestablished desired nominal temperature for said chemical conversion and the step of regulating the supply of steam from said second steam boiler to the steam conduit system to maintain said first steam header at said first preselected nominal pressure.

15. In a cogeneration plant having a combined heat recovery and emission control system for the recovery of heat from and reduction of pollutants in a high temperature exhaust gas stream, the combined system comprising a plurality of steam boilers, each having at least one bank of a plurality of steam generating tubes, a steam conduit system, an emission control unit for reducing pollutants in the exhaust gas stream by predetermined treatment of the exhaust gas stream at a preestablished desired nominal temperature, a duct for conducting the exhaust gas stream through said banks of steam generating tubes and the emission control unit, the plurality of steam boilers comprising a first steam boiler having its said bank of steam generating tubes upstream of the emission control unit, and a second steam boiler having its said bank of steam generating tubes downstream of the emission control unit, said first and second steam boilers being connected for supplying steam to the steam conduit system, the improvement wherein said first steam boiler is an exhaust gas temperature regulating boiler having a first, temperature responsive, boiler control system for regulating the supply of steam from said first steam boiler to the steam conduit system in accordance with the temperature of the exhaust gas stream at the emission control unit, to regulate the operating pressure of said first steam boiler, and thereby regulate the temperature and heat exchange rate of said bank of steam generating tubes of said first steam boiler, to maintain the exhaust gas stream at the emission control unit at said preestablished desired nominal temperature.

16. A cogeneration plant according to claim 15 having a firing system with a fuel injection unit for producing the high temperature exhaust gas stream, the conduit system having at least one steam header for supplying steam at a first preselected nominal pressure, the firing system comprising a fuel control system for regulating the fuel injection rate of the fuel injection unit to prevent the pressure in said first steam header from decreasing below a predetermined nominal pressure less than said first preselected nominal pressure.

17. A method of recovering heat from and reducing the pollutants in a high temperature exhaust gas stream having a variable inlet temperature, with a combined heat recovery and emission control system having a first steam boiler with at least one bank of a plurality of steam generating tubes, a steam conduit system, an emission control unit for reducing pollutants in the exhaust gas stream by chemical conversion at a preestablished desired nominal temperature less than said variable inlet temperature, a duct for conducting the exhaust gas stream through said bank of steam generating tubes and the emission control unit, said first steam boiler having its said bank of steam generating tubes upstream of the emission control unit and being connected for supplying steam to the steam conduit system, the method comprising regulating the supply of steam from said first steam boiler to the steam conduit system in accordance with the temperature of the exhaust gas stream at the emission control unit, to regulate the operating pressure of said first steam boiler within a pressure range having a predetermined maximum pressure no greater than the saturation pressure at said preestablished desired nominal temperature, and thereby regulate the temperature and heat exchange rate of said bank of steam generating tubes of said first steam boiler, to maintain the exhaust gas stream at the emission control unit at said preestablished desired nominal temperature.

* * * * *